Feb. 7, 1967 G. G. ROGERS 3,303,252
METHOD OF FORMING PRODUCTS EXTRUDED FROM PLASTIC MATERIAL
Filed March 19, 1963 2 Sheets-Sheet 1
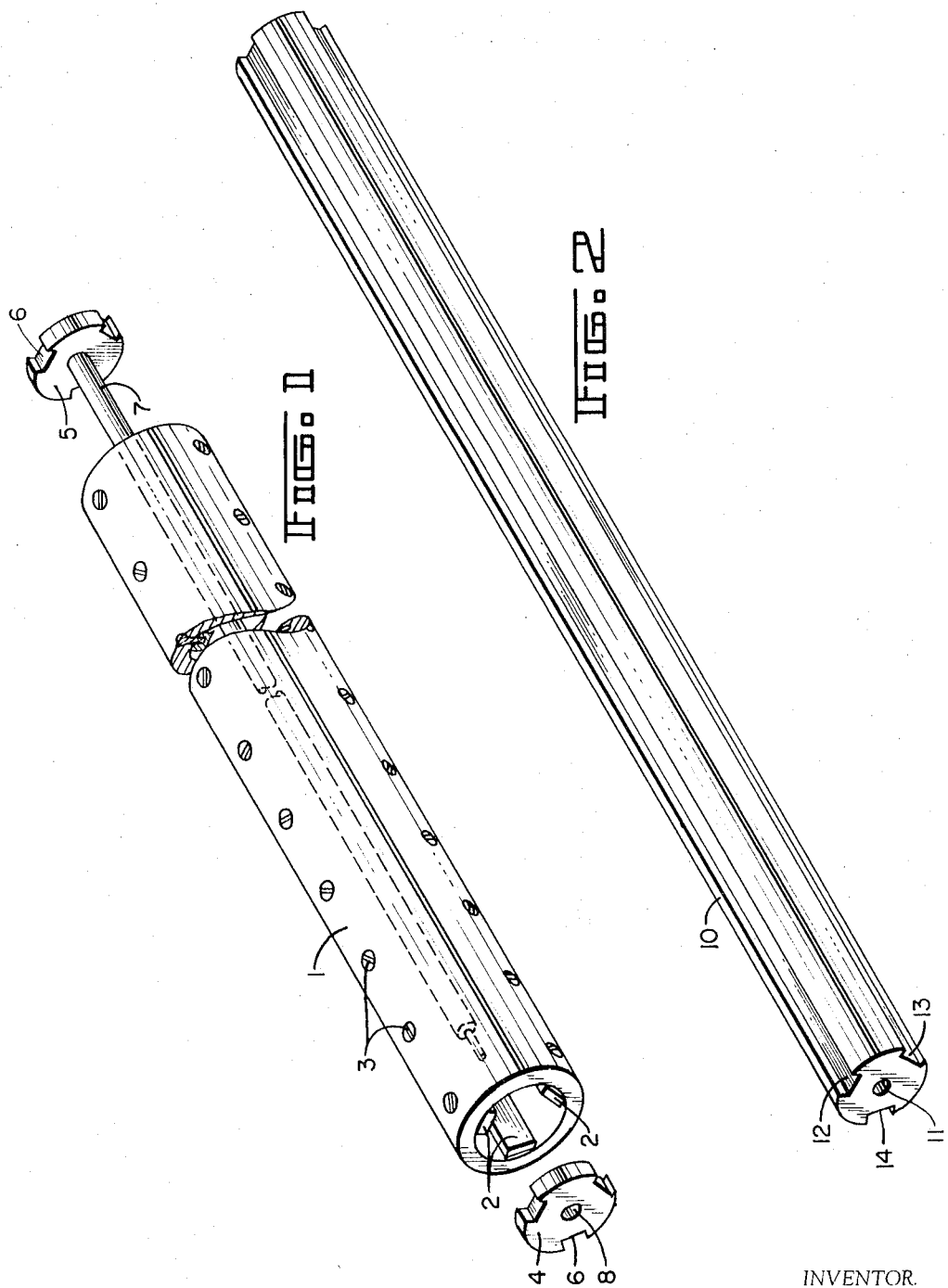
INVENTOR.
GERSON GEORGE ROGERS
BY
*Robertson & Smythe*
ATTORNEYS.

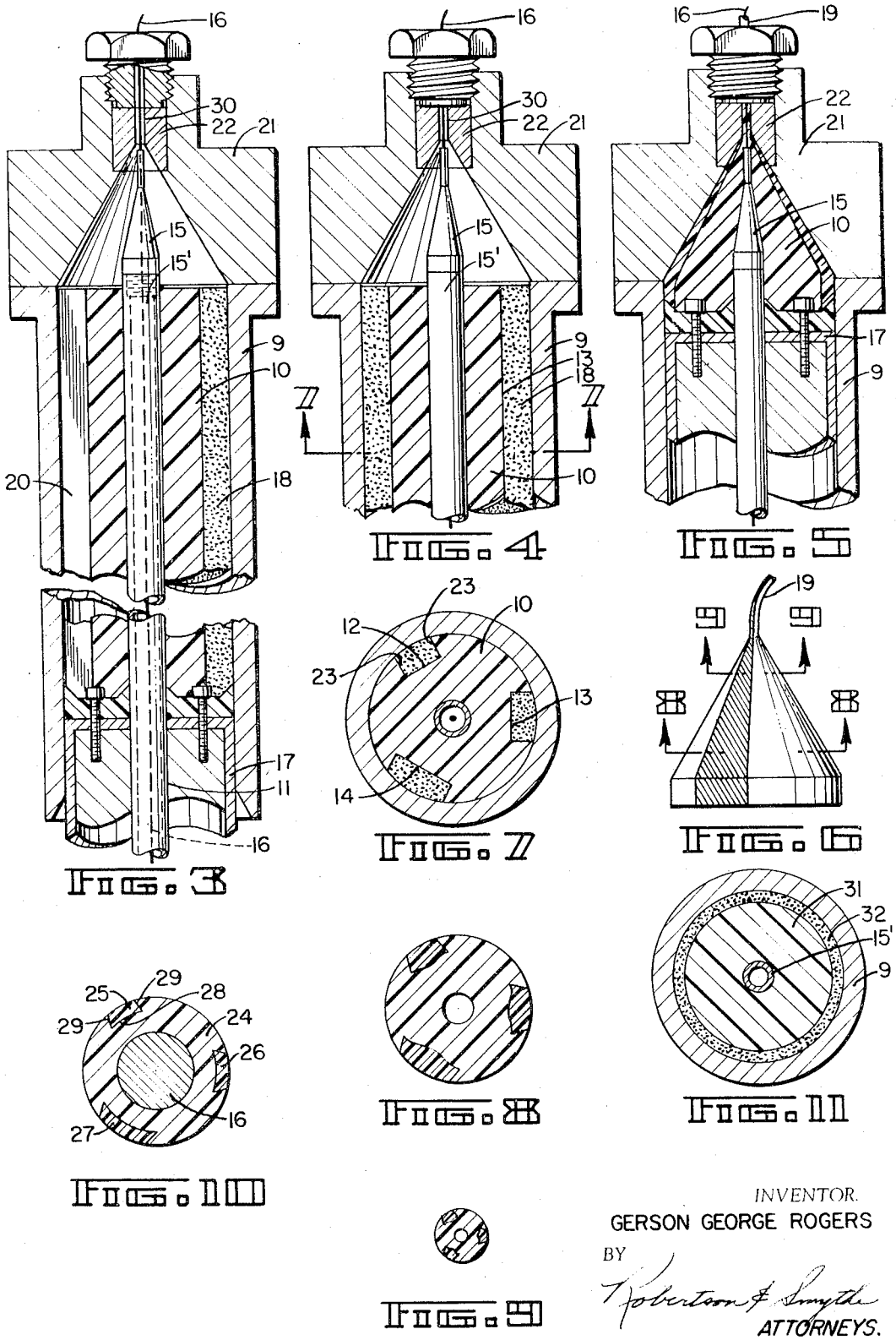

United States Patent Office 3,303,252
Patented Feb. 7, 1967

3,303,252
METHOD OF FORMING PRODUCTS EXTRUDED FROM PLASTIC MATERIAL
Gerson George Rogers, Riverton, N.J., assignor to Philadelphia Insulated Wire Company, Moorestown, N.J.
Filed Mar. 19, 1963, Ser. No. 266,295
7 Claims. (Cl. 264—174)

The invention relates to the extrusion of plastics in the manufacture of plastic-coated wire or other plastic bodies, and more particularly to the formation of plastic bodies having inlays or overlays of materials having visual or functional characteristics contrasting with those of the bodies themselves. My invention has special application, for example, to the formation of inlaid stripes in insulating coatings extruded upon wire conductors.

The striping of insulating coatings has been performed heretofore either by inking the stripes upon the surface of the coating or by extruding the coating from a varicolored plastic "preform." The latter method has been employed in the extrusion of coatings of polytetrafluoroethylene, commonly known as "Teflon" coatings. Conventional extrusion equipment and techniques are employed, not differing essentially from those used in extruding ordinary Teflon coatings without stripes. The varicolored preform is produced by pouring masses of loose Teflon powder into a cylinder having pie-shaped dividers to segregate powders of different pigmentation, removing the dividers and then compressing the several masses to produce a solid preform having sectors of the different colors. This procedure has been considered fairly satisfactory in the past, but does not seem to work so well under the conditions of present day manufacturing requirements under which it is considered desirable to use longer preforms. At the present state of the art, such preforms are 36" long. These long preforms can be readily produced in a single color, but when an 84" cylinder which is used to make a 36" preform, must be filled with materials of different pigmentation divided into pie-shaped sectors, considerable difficulty has been experienced in getting the lubricated pigmented Teflon powder to flow into the cylinder in a manner to fill it without air pockets or blockages developing. To overcome this, it has been found necessary to fill the preform molds in stages, stopping to hammer or vibrate the mold and partially extract the dividers before adding more of the powder. Thus the forming of the long preforms has proved to be laborious and time-consuming, and there is always the chance that the preforms will not turn out to be uniform from end to end in which case the extruded coating may be imperfect in places.

I have discovered how to avoid these and other difficulties heretofore encountered, by producing an inlaid stripe in extruded Teflon coatings in a manner which makes it unnecessary to use a vari-colored preform at all. Moreover, by my method I can produce a different form of inlaid stripe in which the material of the stripe is interlocked at its edges with the material of the body of the coating so that the stripe can be located just along the surface of the coated wire. The material of the stripe is not preformed and therefore does not need to be introduced into the preform mold, thus eliminating entirely the steps of inserting dividers into the mold and later removing them. This results in greatly simplifying the manufacturing procedure.

According to my invention, the plastic extrusion preform is made of just one material, i.e. material of one pigmentation. This material is molded under pressure to form an elongated body having not only the usual central opening extending from end to end thereof, but also having at least one open longitudinal groove in its outer surface. This grooved preform is placed into a conventional extrusion cylinder of the type commonly used in extruding Teflon coatings or the like on wire. The wire to be coated extends through the central opening of the preform. When the preform is in position in the extrusion cylinder, there will be a free space created by the longitudinal groove between the preform and the walls of the extrusion cylinder. Into this free space is introduced a loose plastic material contrasting visibly with the compressed material of the preform. Ordinarily the visible contrast is produced by the use of colored pigments. For example, the preform might be white or yellow, and the loose plastic material filled into the groove could be black or blue, or some other color. In some cases it might be desired to use the same color in contrasting shades. After the loose plastic material has been filled into the free space created by the grooves in the preform, the extrusion cylinder can be operated in the usual manner. The result will be to extrude around the wire emanating from the cylinder a coating which is formed as a composite of the pressure-molded preform body and the plastic material introduced into the groove formed in the body.

In the preferred practice of my invention, the preform is molded with a plurality of longitudinal grooves spaced around its outer surface. This can be done even in cases where only a single stripe is desired. In such cases the grooves which are not to be used for striping are filled with a loose plastic material which matches the material of the preform so as to avoid visible contrast. The advantage of using a number of longitudinal grooves spaced around the outer surface of the preform is that the pressures can be kept more uniform around the periphery of the extrusion die, thus to avoid any tendency to produce an asymmetrical coating such as can more readily occur if there is only a single groove at one side filled with the loose previously uncompressed striping powder.

I have discovered that by having the sides of the groove in the preform extend inwardly of its outer surface in substantial parallelism to one another, the action of extruding the pressure-molded body concurrently with the loose striping powder, results in a peculiar folding action upon the edges of the groove so that the inlaid stripe will be locked into the body of the coating. This produces a plastic coated wire comprising an extruded coating having an enveloping portion completely surrounding the wire and an inlaid stripe of material visibly contrasting with such enveloping portion, the inlaid stripe being locked into the enveloping portion by the edges of the latter which are folded over into interlocking engagement with the edges of the inlaid stripe. The stripe appears in cross-section as a form extending peripherally of the enveloping portion of the coating and spaced from the surface of the wire, such form having a widened base providing the aforesaid interlocking engagement with the enveloping portion of the coating.

With reference to the accompanying drawings, I shall now describe the best mode contemplated by me for carrying out my invention.

FIG. 1 is a perspective view of the mold apparatus used in producing the grooved preform.

FIG. 2 is a perspective view of the grooved preform.

FIG. 3 is a central vertical cross-sectional view of an extrusion cylinder into which the grooved preform has been inserted. This view also shows how the loose plastic striping material is filled into one of the grooves of the preform. (A central portion of the extrusion cylinder and preform has been broken away.)

FIG. 4 is a similar cross-sectional view of the upper end of the assembly of FIG. 3 showing the preform grooves completely filled with loose powder and the removable head of the extrusion cylinder and associated die fixed in place preparatory to beginning the extruding operation.

FIG. 5 is a view similar to FIG. 4 illustrating the final stage of the extruding operation.

FIG. 6 is a side elevational view of the heel of the Teflon material remaining in the front of the extruder at the conclusion of the operation.

FIG. 7 is a transverse sectional view taken on the line 7—7 of FIG. 4.

FIG. 8 is a transverse sectional view taken on the line 8—8 of FIG. 6.

FIG. 9 is a transverse sectional view taken on the line 9—9 of FIG. 6.

FIG. 10 is a cross-sectional view of the coated wire, greatly enlarged.

In FIG. 1 we see the mold apparatus for producing the grooved preform. This apparatus comprises a cylindrical metal tube 1 to the interior of which is secured one or more flat metal strips 2 extending from end to end of the tube. The strips 2 may be affixed to the tube in any convenient manner as by means of the machine screws 3. I have obtained satisfactory results with the use of strips made of polished steel. End caps 4 and 5 complete the mold, these caps being notched as at 6, to fit around the strips 2 with sufficient tolerance between the caps and the tube (and strips) to permit the end caps 4 and 5 to slide along the inside of the mold. To one of the end caps is secured the preform rod 7 which is designed to have a sliding engagement with opening 8 disposed centrally of the other cap.

In the operation of the mold apparatus, end cap 5 is engaged with one end of the tube 1 which is then swung into a vertical position with cap 5 forming the base of the mold. Pigmented or unpigmented Teflon powder in loose form with a lubricant added, is then poured into the upper end of the mold, after which end cap 4 is dropped into the upper end of the mold and around the preform rod 7. The contents of the mold are then compressed from either end. In the performance of this step, one of the end caps 4 or 5 is locked against movement and the other of the two driven inwardly of the tube as by means of a plunger actuated by pneumatic, hydraulic or other suitable means to compress the Teflon powder into a self-sustaining solid form as an elongated body having a central opening extending from end to end thereof and at least one longitudinal groove in its outer surface. At the conclusion of the pressure molding operation, the grooved preform is ejected from the mold along with the caps and preform rod. This is transported to the extruder, at which point the grooved preform is slid off the preform rod and inserted into the empty barrel 9 of the extruder. To assist in sliding the preform off the rod 7, a duplicate of disc 4 may be placed adjacent disc 5 before molding of the preform. This duplicate disc supports the end of the preform as the latter is drawn off the rod 7, and while it is being transported to the extruder. The grooved preform itself is shown in FIG. 2 as comprising an elongated body 10 formed with central opening 11 extending from end to end thereof and with a plurality of longitudinal grooves 12, 13, 14 spaced around its outer surface.

As the grooved preform is inserted into the extrusion barrel 9, the guider tip 15 and guider tube 15' together with an end of the bare wire 16 which is to be coated, extending therefrom, passes through the central opening 11 of the preform as may be seen in FIG. 3. The base of the preform rests upon the plunger 17 at the lower end of extruder barrel 9. There is now introduced into the free space 20 which the longitudinal groove 12 (and/or grooves 13, 14) creates between the preform body 10 and the walls of the extrusion barrel 9 a loose plastic material 18 contrasting visibly with the material of the body. This is the inlaying material which normally will be of a different color than that of the grooved preform. The pigmenting and mixing of the inlaying material are performed in a manner to produce an inlay of sufficiently dense color to afford satisfactory contrast with the background color, be opaque to the background color and weld or adhere to the background material when the section of the inlay is quite thin. The head 21 and associated die 22 of the extruder are placed over the upper end of the extruder barrel and clamped in place in suitable manner. Thereafter the extrusion cylinder is operated to extrude around the wire 16 emanating therefrom a coating 19.

With reference to FIG. 7, it will be observed that the sides 23 of groove 12 extend inwardly of the outer surface of preform 10 in substantial parallelism to one another. When the groove in the preform was formed in this manner, I observed that the extrudate emerged as a coating comprising an enveloping portion 24 formed from the pressure-molded body (FIG. 10) completely surrounding the wire 16, and inlaid stripes 25, 26, 27 locked into the enveloping portion by the edges of the latter which are folded over into interlocking engagement with the edges of the inlaid stripes. In the cross-section of the insulated wire as appearing in FIG. 10, each inlaid stripe is of a form which extends peripherally of the outer portion of the coating and which is spaced from the surface of the wire. Such form has a widened base, as at 28, and side walls 29 which are inclined toward one another, providing the interlocking engagement aforementioned. This interlocking of the inlaid stripes with the enveloping portion of the insulation was not expected but was first discovered when I observed cross-sectional cuts of the insulated wire and of the heel of the preform following extrusion. It is possible that the folding over of the parallel sides 23 of the original grooves in the preform into the inclined disposition shown at 29 in the extrudate comprising the coating of the insulated wire product may occur as the result of employing a pressure-molded preform in combination with the loose striping powder which has not been compressed prior to extrusion. The moments of force upon the Teflon inside the extruder, master die, and die while the Teflon is extruding onto the wire apparently cause the parallel margins of the groove to fold over and lock in the inlaid material.

Also, the flat base of the groove is seen in a cross-section of the final insulation to bulge out as at 28, FIG. 10, so as to acquire an approximate arc shape which is roughly concentric with the outside circumference of the insulation. This bulging most likely occurs in the die where the wire and Teflon meet rather than in the taper leading into the die judging from a comparison of FIGS. 8 and 10. The difference in the density between the compressed Teflon of the grooved single color preform and that of the loose, finely divided, free flowing, inlaying Teflon which is poured down into the space, seemingly influences the forces acting upon the charge during extrusion. The outer extremities of the parallel margins of the grooved preform fold over and lock around the uncompressed lower bulk density Teflon of the inlaying material. Irrespective of whether or not this is a correct analysis of what happens in the extrusion process, it is an observed fact that the interlocking action is somehow brought about during extrusion and I do not wish to be bound by any particular theory of the operation in respect of this aspect of my invention. Yet it may be appropriate to add that it does not appear possible to attain such an interlocking of the inlay if the bulk density of the background material and the inlay material are the same regardless of whether they are both loose and uncompressed when brought together or both previously compressed and assembled. Therefore, I believe that one of the essential features of my invention resides in the use of a grooved pressure-molded preform in combination with a loose plastic material flowed into the groove after the preform has been put into the extruder so that the extrusion operation can be performed upon materials which are of different densities when brought together. The advantages of this procedure may now be summarized as follows:

(1) Elimination of the need to introduce dividers into the preform mold and later remove such dividers, thus doing away entirely with two steps, (2) Elimination of the problem of filling the spaces between dividers as encountered in producing the long 36" preforms used commerically today, (3) The possibility of producing an inlaid stripe extending peripherally of the coating and spaced from the wire, and interlocked with the background material, and (4) The possibility of producing thinner inlays than are practicable with prior methods when using materials of comparable character and bulk density.

My method of extruding a combination of compressed and uncompressed materials can be used to produce extremely thin inlays or overlays due to the extrusion phenomenon according to which the lower density uncompressed material is reduced in thickness before reaching the tapered portion at the end of the extrusion cylinder. This is illustrated by comparing FIGS. 4 and 5. Notice that the thickness of the striping material as seen in cross-section in FIG. 5 has been substantially reduced from that shown in FIG. 4. Such reduction in thickness may, for example, be on the order of two thirds, i.e. the thickness just at the point of entry into the tapered portion may be only a third that of the depth of grooves 12, 13 and 14.

According to another aspect of my invention, a number of longitudinal grooves are spaced around the outer surface of the preform as at 12, 13, 14 in FIG. 2. This avoids any tendency to throw the concentricity of the insulated wire off center as may occur when only a single groove preform is used. Therefore, even if it is desired produce an insulating coating having just one stripe, or having stripes which are not uniformly spaced around the circumference, I have found that it is still advantageous to use grooves spaced around the circumference more or less uniformly. Then the grooves which are not used for striping purposes can be filled with uncompressed Teflon of the same color as the background. I have found that when this is done the concentricity of the product is substantially improved. This is most likely due to a more uniform distribution of internal forces around the center hole, occurring as a result of a more uniform distribution of the low density uncompressed Teflon filling the grooves.

My inlaid stripes may be formed in a similar way in the surfaces of extruded plastic tubing or wire. In the case of plastic tubing, guider tip 15 may be solid (instead of having a hole through it for the metal wire 16) and extend into or through the land 30 of the die 22. As before, the preform would be grooved as at 12, 13, 14, placed in the extrusion cylinder, and the loose plastic material introduced into the free space which the grooves create between the preform and the walls of the extrusion cylinder, extruding the combined pressure-molded preform and loose plastic material together. In the case of plastic wire, rod or filament, the same procedures would be followed except that guider tip 15 would be removed altogether.

According to another embodiment of my invention, the inlaid stripe is replaced by an overlay. In this case the preform, instead of being grooved may be made in the form shown in FIG. 11. Here the preform appears in cross-section at 31 as a cylindrical tube whose outside diameter is less than the inside diameter of extrusion cylinder 9. Guider tube 15' holds the preform in concentric relation to the cylinder. Loose plastic material 32 is introduced into the free space between the preform and the walls of the extrusion cylinder, and extrusion carried out as before. Overlay 32 may be made from a conductive material or material containing a conductive powder to produce a coated wire having a protective shield. I am aware that it has been proposed heretofore to extrude plastic coated wire having a filled composition outer layer, using a method in which the material for the outer layer is initially pressure-molded as a part of the preform. My method avoids the need to do this, so that the preform can be molded simply from a single material, the outer layer being extruded directly from a loose uncompressed powder poured into the space between the simple preform and the inside walls of the extrusion cylinder.

My method is applicable also to the extrusion of combinations of pressure-molded materials and loose uncompressed materials wherein the latter are disposed interiorly of the pressure-molded portion of the combination, i.e. interiorly of the preform itself rather than exteriorly as in cases where the loose uncompressed materials are disposed in exterior grooves of the preform, or around the preform as an overlay as described in the preceding paragraph. For example, a preform similar to that shown in FIG. 2 can be made without the grooves 12, 13, 14, and placed into an extrusion cylinder 9 from which guider tip 15 and tube 15' have been removed, following which a loose uncompressed plastic powder such as Teflon is flowed into the center hole 11 of the preform, extrusion then being performed in the usual manner. Similarly loose powder can be filled into spaces formed in other positions interiorly of the preform than at the center. This feature can be employed to advantage where it is desired to color code a product by markings which will show up in the cross-section thereof but not appear on the surface. In general, my invention contemplates the extrusion of materials at least one of which is introduced into the extrusion cylinder as a pressure-molded body, and at least one other of which is introduced in a loose uncompressed form, the two materials having characteristics which differ in some way from one another. Thus the difference may be one of color or one which has to do with physical or electrical properties such as abrasive resistance, conductivity, or both.

The terms and expressions which I have employed are used in a descriptive and not a limiting sense, and I have no intention of excluding equivalents of the invention described and claimed.

I claim:

1. The method of forming products extruded from plastic material such as polytetrafluoroethylene, which comprises the steps of molding under pressure an elongated body of such material to be used as an extrusion preform, placing said elongated body into an extrusion cylinder, the preform being made with a cross-sectional area which is less than that of the interior of the extrusion cylinder so as to provide a free space extending from end to end of the preform, introducing into said space a loose material having characteristics differing from those of the material of the preform, and thereafter operating the extrusion cylinder to form an extruded product comprised of a composite of the pressure-molded body and the plastic material introduced into said space.

2. The method of forming products according to claim 1 in which the preform is made in a smaller diameter than that of the interior of the extrusion cylinder and is held centrally of the cylinder to provide a free space in the form of a clearance between the preform and the walls of the extrusion cylinder whereby the loose material is extruded as an overlay surrounding the material extruded from the preform.

3. The method of forming products according to claim 1 in which the preform is made in a diameter substantially the same as that of the interior of the extrusion cylinder and is formed with a longitudinal groove providing a free space extending from end to end of the preform whereby the loose material is extruded as an inlaid stripe in the surface of the extruded product.

4. The method of forming products according to claim 1 in which the preform is formed with an opening extending from end to end interiorly of the preform whereby the loose material is extruded as an interior stripe within the material extruded from the preform.

5. The method of forming an inlaid stripe in extruded wire coatings of plastic material such as polytetrafluoroethylene, which comprises the steps of molding under pressure an elongated body of such material to be used as an extrusion preform, said elongated body being formed with a central opening extending from end to end thereof, and with at least one longitudinal groove in its outer surface, placing said elongated body into an extrusion cylinder with the wire to be coated extending through said central opening, introducing into the free space which said longitudinal groove creates between said body and the walls of the extrusion cylinder a loose plastic material contrasting visibly with the material of said body, and thereafter operating the extrusion cylinder to extrude around the wire emanating therefrom a coating formed as a composite of the pressure-molded body and the plastic material introduced into the groove formed in said body.

6. The method of forming an inlaid stripe in extruded wire coatings of plastic material such as polytetrafluoroethylene, which comprises the steps of molding under pressure an elongated body of such material to be used as an extrusion preform, said elongated body being formed with a central opening extending from end to end thereof, and with a plurality of longitudinal grooves spaced around its outer surface, placing said elongated body into an extrusion cylinder with the wire to be coated extending through said central opening, introducing into the free spaces which said longitudinal grooves create between said body and the walls of the extrusion cylinder loose plastic material, the loose plastic material introduced into at least one of said spaces contrasting visibly with the material of said body, and thereafter operating the extrusion cylinder to extrude around the wire emanating therefrom a coating formed as a composite of the pressure-molded body and the plastic material introduced into the grooves formed in said body.

7. The method of forming an inlaid stripe in extruded wire coatings of plastic material such as polytetrafluoroethylene, which comprises the steps of molding under pressure an elongated body of such material to be used as an extrusion preform, said elongated body being formed with a central opening extending from end to end thereof, and with at least one longitudinal groove in its outer surface, the sides of the groove extending inwardly of said outer surface in substantial parallelism to one another, placing said elongated body into an extrusion cylinder with the wire to be coated extending through said central opening, introducing into the free space which said longitudinal groove creates between said body and the walls of the extrusion cylinder a loose plastic material contrasting visibly with the material of said body, and thereafter operating the extrusion cylinder to extrude around the wire emanating therefrom a coating comprising an enveloping portion formed from said pressure-molded body and an inlaid stripe formed from the visibly contrasting loose plastic material locked into said enveloping portion by the extruding action which folds the edges of the groove into interlocking engagement with the edges of the inlaid stripe.

References Cited by the Examiner

UNITED STATES PATENTS

| | | | |
|---|---|---|---|
| 1,477,094 | 12/1923 | Wilson | 264—241 |
| 1,823,180 | 9/1931 | White et al. | 264—323 X |
| 2,170,931 | 8/1939 | Schafer | 264—246 X |
| 2,573,050 | 10/1951 | Orsini | 264—246 X |
| 2,863,174 | 12/1958 | Schuman et al. | 264—323 |
| 2,930,083 | 3/1960 | Vostovich et al. | 264—174 |
| 2,941,240 | 6/1960 | Distler | 264—323 X |
| 2,945,265 | 7/1960 | Sell et al. | 264—246 X |
| 3,059,046 | 10/1962 | Westervelt et al. | 174—110 |
| 3,072,737 | 1/1963 | Chen | 174—110 |
| 3,112,986 | 12/1963 | Woodell | 264—174 |
| 3,166,612 | 1/1965 | Sauer et al. | 264—174 X |

ROBERT F. WHITE, *Primary Examiner.*

ALEXANDER H. BRODMERKEL, *Examiner.*

F. MARLOWE, L. S. SQUIRES, *Assistant Examiners.*